W. T. CHRISTY.
KILN FOR FIRE-BRICK.
No. 171,600.  Patented Dec. 28, 1875.
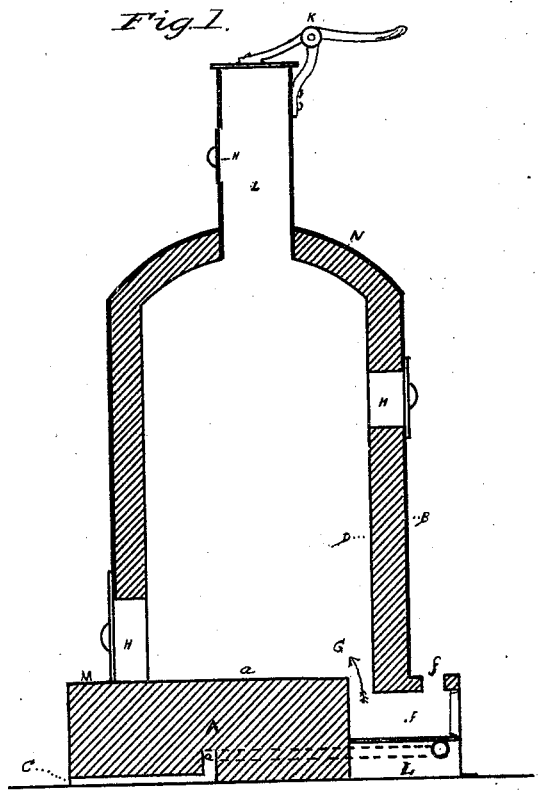
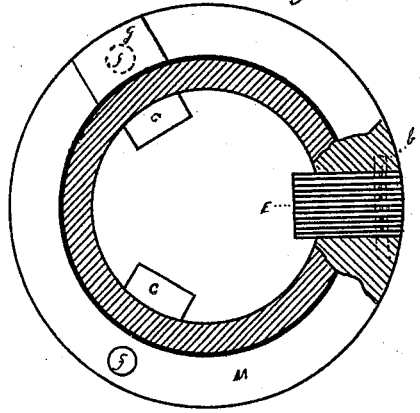
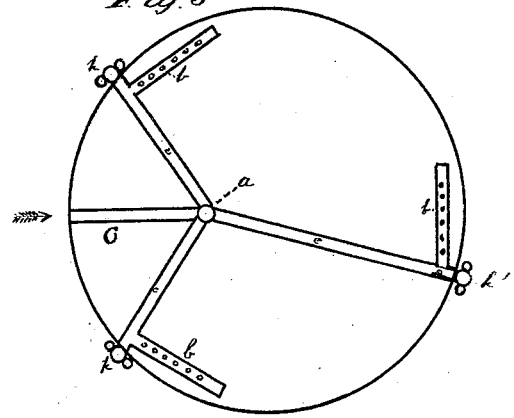
WITNESSES  INVENTOR

UNITED STATES PATENT OFFICE.

WILLIAM T. CHRISTY, OF ST. LOUIS, MISSOURI.

IMPROVEMENT IN KILNS FOR FIRE-BRICK.

Specification forming part of Letters Patent No. 171,600, dated December 28, 1875; application filed September 15, 1875.

*To all whom it may concern:*

Be it known that I, WILLIAM T. CHRISTY, of St. Louis, county of St. Louis and State of Missouri, have invented a new and improved kiln for the more rapid and perfect burning of fire-brick and other refractory fire - proof forms; and I do hereby declare that the following is a full and exact description thereof.

The nature of my invention consists in the construction of fire-brick kilns with exterior shells of riveted plate-iron, with thick fire-brick linings.

The principle of up-draft for the easier promotion of combustion is used, and for the further facility that it affords for the introduction of a blast of air of from one-half pound to two pounds pressure, to be directed under the fire-bed, for the purpose of hastening the operation of final burning as soon as the brick or form is thoroughly dried.

The great heat at which I burn my brick renders all other methods of kiln construction inapplicable, from their lack of power to resist lateral expansion, and the unavoidable cracking and displacement that attend any banded kiln.

Many years' experience with the most approved kilns in present common use, and sufficient practical use of my improved kiln, enable me to state the following facts:

All fire-clay forms that are to be subjected to high stress in use, if inherently incapable of withstanding such stress, are detected by partial or total destruction during the burning.

All forms of fire-clay work, particularly lining-brick, tuyeres, nozzles, stoppers for Bessemer work, glass-pots, &c., when thoroughly dried by moderate heat, are capable of being burned in two-thirds less time, with two-thirds less fuel, and much less labor, than by the limited heat of the present system, and possess an exceedingly hard and sonorous body, with that uniform glazed surface so desirable to the furnaceman, and so indicative of the highest qualities of resistance to heat or corrosion.

Fifteen tons of fire-clay, in such forms as above named, when thoroughly dried by a moderate heat, can be most perfectly burned with a consumption of about fifty bushels of coal when under a pressure of two pounds of blast. A full kiln can be properly burned thus in eighteen to twenty-four hours.

I construct my kilns to contain from ten to sixty thousand brick, more or less.

The crown of my kiln I construct of fire-brick. The skew-backed bricks being all within the iron shell, offer a firm and comparatively unyielding bed against which to set the arch.

I do not confine myself to the number of mouths or blasts that I may think proper to use.

The following is a description of the kiln with reference to the appended drawings, in which Figure 1 is an elevated section; Fig. 2, a horizontal section, showing the bench, the firing-mouths, and up-drafts. Fig. 3 is a horizontal section passing below the grates, and showing the manner of distribution of the air-blast pipes.

To enable others skilled in construction and use of kiln to make use of my invention, I will proceed to describe particularly its various parts.

A, Fig. 1, is a part of the foundation that is carried up thirty-nine inches. The bench M is provided with the fire-place openings F and the up-drafts G G G, the channels C $a$ for the passage of the main pipe C and branch air-pipes $c\ c\ c$, the ash-pit I, and feed-hole $f$. B is the riveted iron shell, fourteen feet high, and twelve to sixteen feet diameter. D is the inside fire-proof lining, ordinarily nine inches thick; E, Fig. 2, the firing-grate, with the blast $b$ underneath; H H H, side doors for the reception and delivery of goods in either state; I, ash-pit, seventeen inches deep. $a$ is a three-way branch bulb to main blast-pipe C, which is ten inches in diameter, and the branches $c$ $c\ c$ four inches, with perforated cross-pipe $b\ b\ b$. These branches are placed, as shown, to leave all possible strength to the kiln floor. $h\ h\ h$ are regulating stock - valves. $h'$ shows the stock, which, by turning entirely, cuts off the air, or allows regulated quantities up to the full blast. K is a register-valve. The feed - holes $f\ f$ are stopped by placing tiles over them. The fronts of the fire-places and ash-pits are closed tightly with closely-fitting tiles. The jambs of the fire-places and the cover-tiles of the arches are of the very best quality of fire-proof work. I suggest no particular style of blast. The crown N is made of the best of fire-brick, having an opening three feet in diameter for the flue L, which is lined with fire-brick.

What I claim as my invention, and desire to secure by Letters Patent of the United States, is—

The combination, in a fire-brick kiln, substantially as described, of a fire-brick lined metallic shell, with the arrangement of the blast-pipes passing under the heated kiln-bottom, with each a regulating stock-valve for tempering the blast, and having also a many-perforated pipe under each fire-chamber for blowing air upward between the grate-bars, together with the up-draft and the crown-opening for the unimpeded passage of the consumed and exhausted air and gases.

WILLIAM T. CHRISTY. [L. S.]

Witnesses:
J. C. H. CUNNINGHAM,
J. F. PARSONS.